United States Patent
Yamada et al.

(10) Patent No.: US 7,887,139 B2
(45) Date of Patent: Feb. 15, 2011

(54) VEHICLE SEAT FRAME

(75) Inventors: Yukifumi Yamada, Toyota (JP); Hiroyuki Okazaki, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 12/670,369

(22) PCT Filed: Oct. 22, 2008

(86) PCT No.: PCT/JP2008/069116
§ 371 (c)(1), (2), (4) Date: Jan. 22, 2010

(87) PCT Pub. No.: WO2009/066534
PCT Pub. Date: May 28, 2009

(65) Prior Publication Data
US 2010/0187887 A1 Jul. 29, 2010

(30) Foreign Application Priority Data
Nov. 20, 2007 (JP) .............................. 2007-300102

(51) Int. Cl.
*A47C 7/02* (2006.01)
*B60R 22/00* (2006.01)

(52) U.S. Cl. .............................. 297/452.18; 297/452.2; 297/470

(58) Field of Classification Search ............ 297/452.18, 297/452.2, 468, 470, 486
See application file for complete search history.

(56) References Cited

U.S. PATENT DOCUMENTS

| 4,890,888 | A | | 1/1990 | Kostin | |
|---|---|---|---|---|---|
| 5,318,341 | A | * | 6/1994 | Griswold et al. | ....... 297/362.11 |
| 5,564,785 | A | * | 10/1996 | Schultz et al. | ........... 297/452.2 |
| 5,681,081 | A | * | 10/1997 | Lindner et al. | ......... 297/216.13 |
| 5,746,476 | A | | 5/1998 | Novak et al. | |
| 5,984,419 | A | * | 11/1999 | Partington et al. | .......... 297/473 |
| 6,375,268 | B2 | * | 4/2002 | Okazaki et al. | ........ 297/452.18 |
| 6,585,325 | B1 | * | 7/2003 | Pal | .............................. 297/483 |
| 6,817,672 | B2 | | 11/2004 | Matsunuma | |

(Continued)

FOREIGN PATENT DOCUMENTS

JP  9-136610 A  5/1997

(Continued)

OTHER PUBLICATIONS

International Search Report (PCT/ISA/210) for PCT/JP2008/069116 mailed Feb. 17, 2009.

*Primary Examiner*—Sarah B McPartlin
(74) *Attorney, Agent, or Firm*—Buchanan Ingersoll & Rooney PC (57) ABSTRACT

A vehicle seat frame which is lightweight and strong includes a seat cushion frame supporting a seat cushion, a seat back frame supporting a seat back, a recliner rotatably connecting the seat back relative to the seat cushion and adjusting the rotation angle thereof and a shoulder belt anchor provided on the seat back frame for supporting one end of a shoulder belt. The back center frame of the seat back frame includes a hollow quadrangular shape outer peripheral portion and a reinforcement plate provided in the outer peripheral portion and placed in parallel with a direction of load to be applied on the shoulder belt anchor from the shoulder belt.

8 Claims, 5 Drawing Sheets

U.S. PATENT DOCUMENTS

| | | | |
|---|---|---|---|
| 6,869,145 B2 * | 3/2005 | Matsunuma | 297/452.18 |
| 7,510,245 B2 * | 3/2009 | Okazaki et al. | 297/483 |
| 2002/0135222 A1 | 9/2002 | Matsunuma | |
| 2003/0062754 A1 | 4/2003 | Yamada | |

FOREIGN PATENT DOCUMENTS

| | | |
|---|---|---|
| JP | 2002-059770 A | 2/2002 |
| JP | 2002-283891 A | 10/2002 |
| JP | 2003-061777 A | 3/2003 |
| JP | 2004-229688 A | 8/2004 |
| WO | WO 96/38318 | 12/1996 |

* cited by examiner

VEHICLE SEAT FRAME

TECHNICAL FIELD

This invention relates to a vehicle seat frame provided with a shoulder belt anchor at an upper end of a seat back frame.

BACKGROUND OF THE TECHNOLOGY

Figure 5:
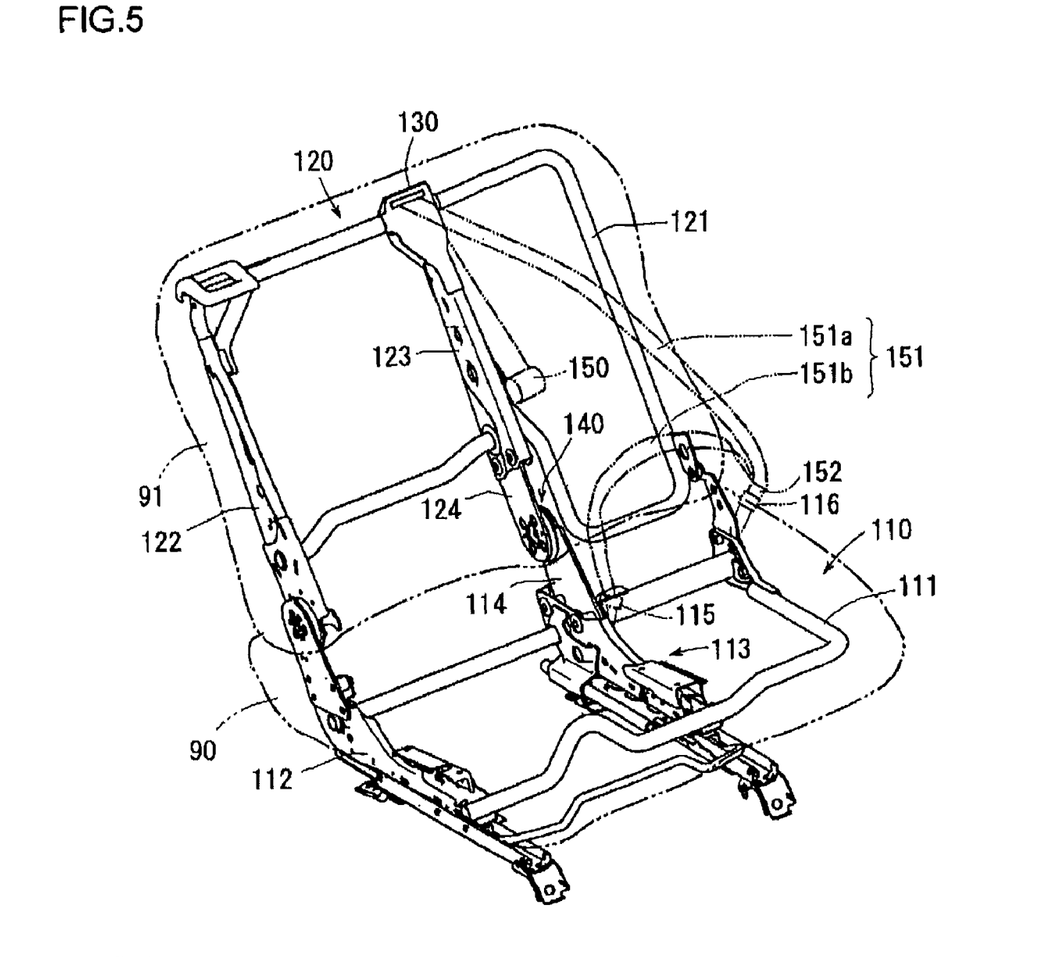
FIG. 5 is a perspective view of a conventional vehicle seat frame.

Conventionally, as shown in FIG. 5, a vehicle seat frame is known, which includes a seat cushion frame 110 supporting a seat cushion 90, a seat back frame 120 supporting a seat back 91, a recliner 140 rotatably connecting the seat back 91 relative to the seat cushion 90 and adjusting the rotation angle thereof and a shoulder belt anchor 130 provided at an upper end of the seat back frame 120. Back side frames 121 and 122 are provided at both sides of the seat back frame 120 and a hollow square prism shaped back center frame 123 is provided at the central portion thereof. Further, cushion side frames 111 and 112 are provided at both sides of the seat cushion frame 110 and a cushion center frame 113 is provided at the central portion thereof. An upper arm 124 formed with a plank is connected to the under portion of the back center frame 123 through bolt means and a lower arm 114 formed with a plank is connected to the upper portion of the cushion center frame 113 through bolt means. The recliner 140 is provided between the upper arm 124 and lower arm 114. The recliner 140 rotatably connects the upper and lower arms 124 and 114.

Further, a retractor 150 is attached to the seat back frame 120 and one end of a seat belt 151, which is structured with a shoulder belt portion 151a and a lap belt portion 151b, is retracted into the retractor 150. The other end of the seat belt 151 is fixed to an anchor plate 115 attached to the cushion center frame 113 and the middle portion of the seat belt 151 is inserted into a tongue plate 152. This tongue plate 152 is detachably attached to a buckle 116 attached to the cushion side frame 111. It is noted that the vehicle seat frame is a seat frame for two occupants and an explanation of the other seat belt for the other person is omitted. According to this vehicle seat frame, since the retractor 150 is attached to the seat back frame 120, when the seat belt 151 is locked upon the vehicle being suddenly decelerated, a large load is applied on the back center frame 123 of the seat back frame 120 through the shoulder belt anchor 130. This may lead to a deformation of the back center frame 123.

Figure 6:
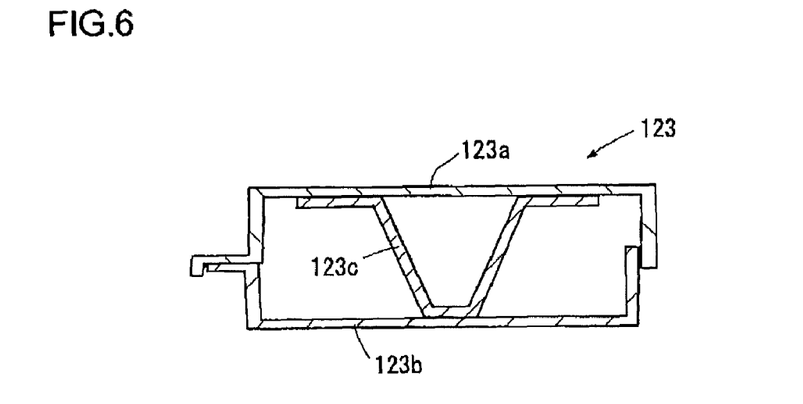
FIG. 6 is a cross sectional view of a back center frame of a conventional vehicle seat frame.

Another conventional vehicle seat frame is proposed which is disclosed in the Patent Document 1. As shown in FIG. 6, the back center frame (tower frame) 123 of the vehicle seat frame according to the Patent Document 1 is formed by welding the side brackets 123a and 123b having approximately U-shape (or reverse C-shape) in cross section and an elongated reinforcement plate (insert brace) 123c is inserted between the side brackets 123a, 123b. According to this vehicle seat frame, since the elongated reinforcement plate (insert brace) 123c is inserted between the both side brackets 123a and 123b, even when the vehicle is suddenly decelerated and a large load is applied on the back center frame (tower frame) 123, the back center frame (tower frame) would not be easily deformed.

Patent Document 1: JA 2002-283891 A

DISCLOSURE OF INVENTION

Problems to be Solved

However, according to the above conventional vehicle seat frame disclosed in the Patent Document 1, the direction of load applied on the back center frame of the seat back frame from the seat belt through the shoulder belt anchor upon vehicle sudden deceleration, is not incorporated into the design and it would not be an effective solution to ensure the strength of the seat back frame.

The present invention was made in consideration with the above problems and the object of the invention is to provide a vehicle seat frame which is lightweight and strong.

Means for Solving the Problem

The vehicle seat frame of this invention in a first aspect made for solving the above problem features that the vehicle seat frame comprises a seat cushion frame adapted to support a seat cushion, a seat back frame adapted to support a seat back, a recliner rotatably connecting the seat back relative to the seat cushion and adjusting the rotation angle thereof and a shoulder belt anchor provided on the seat back frame for supporting one end of a shoulder belt, wherein at least one of the seat cushion frame and the seat back frame includes a hollow quadrangular prism shaped outer peripheral portion and a reinforcement plate provided in the outer peripheral portion so as to be in parallel with a direction of load to be applied on the shoulder belt anchor from the shoulder belt under an occupant of the vehicle being restrained thereby.

The vehicle seat frame of this invention in a second aspect features that, in the first aspect, the outer peripheral portion and the reinforcement plate are formed from a single steel plate by bending and connecting respective bent ends of the bent steel plate.

The vehicle seat frame of this invention in a third aspect features that, in the first aspect, the outer peripheral portion and the reinforcement plate extend in a vehicle upward direction and the shoulder belt anchor is provided at an upper end of the outer peripheral portion and the reinforcement plate.

The vehicle seat frame of this invention in a fourth aspect features that, in the third aspect, the shoulder belt anchor includes a joint portion extending in a vehicle width direction and supporting an outer side surfaces of the outer peripheral portion in a vehicle longitudinal direction, and a belt guide portion extending in a vehicle width direction apart from the joint portion with a predetermined distance and connected to the joint portion at bent ends and that the reinforcement plate is arranged in parallel with a direction in which the shoulder belt inserted between the joint portion and the belt guide portion is pulled out towards a buckle provided at a side portion of the seat cushion frame.

THE EFFECTS OF THE INVENTION

According to the vehicle seat frame in the first aspect, at least one of the seat cushion frame and the seat back frame has a hollow quadrangular prism shaped outer peripheral portion and a reinforcement plate accommodated in the outer peripheral portion. The reinforcement plate is provided in parallel with a direction of load to be applied on the shoulder belt anchor from the shoulder belt under an occupant of the vehicle being restrained thereby. When the seat belt is locked upon the vehicle being under sudden deceleration condition, a large load is applied on the back center frame of the seat back frame through the shoulder belt anchor. However, the reinforcement plate is provided in parallel with the direction of the load applied on the shoulder belt anchor through the shoulder belt and accordingly the deformation of the seat back frame can be sufficiently avoided even the reinforcement plate is made from a thin wall plate. Accordingly, the vehicle seat frame is lightweight and strong.

According to the vehicle seat frame in the second aspect, the outer peripheral portion and the reinforcement plate are formed from a single steel plate by bending and connecting both ends of the bent steel plate. This can reduce the number of component.

According to the vehicle seat frame in the third aspect, the outer peripheral portion and the reinforcement plate are extending in a vehicle upward direction and the shoulder belt anchor is provided at an upper end thereof. Accordingly, the load applied on the shoulder belt anchor from the shoulder belt is mostly received at the outer peripheral portion and the reinforcement plate to restrain the deformation of the seat back frame.

According to the vehicle seat frame in the fourth aspect, the shoulder belt anchor includes a joint portion and a belt guide portion and the joint portion extends in a vehicle width direction and supports an outer side surface of the outer peripheral portion in a vehicle longitudinal direction. According to this structure, a load applied to the shoulder belt anchor from a shoulder belt is mostly received at the outer peripheral portion and the reinforcement plate. Further, the belt guide portion extends in the vehicle width direction apart from the joint portion with a predetermined distance and is connected to the joint portion at bent ends thereof. Therefore, the shoulder belt is easily inserted through the joint portion and the belt guide portion with a simple structure. Further, the reinforcement plate is arranged in parallel with a direction in which the shoulder belt inserted between the joint portion and the belt guide portion is extracted towards a buckle provided at a side portion of the seat cushion frame. Accordingly, the deformation of the seat back frame can be sufficiently prevented even a thin walled reinforcement plate is used.

EXPLANATION OF REFERENCE NUMERALS

10; seat cushion frame, 20; seat back frame, 27; shoulder belt anchor, 30; recliner, 23a, 23b, 23c, 23d; outer peripheral portion (23a, 23b; side plate portion, 23c; front plate portion, 23d; rear plate portion), 23e; reinforcement plate, 51a; shoulder belt, 90; seat cushion, 91; seat back.

THE BEST MODE EMBODIMENTS OF THE INVENTION

Figure 1:
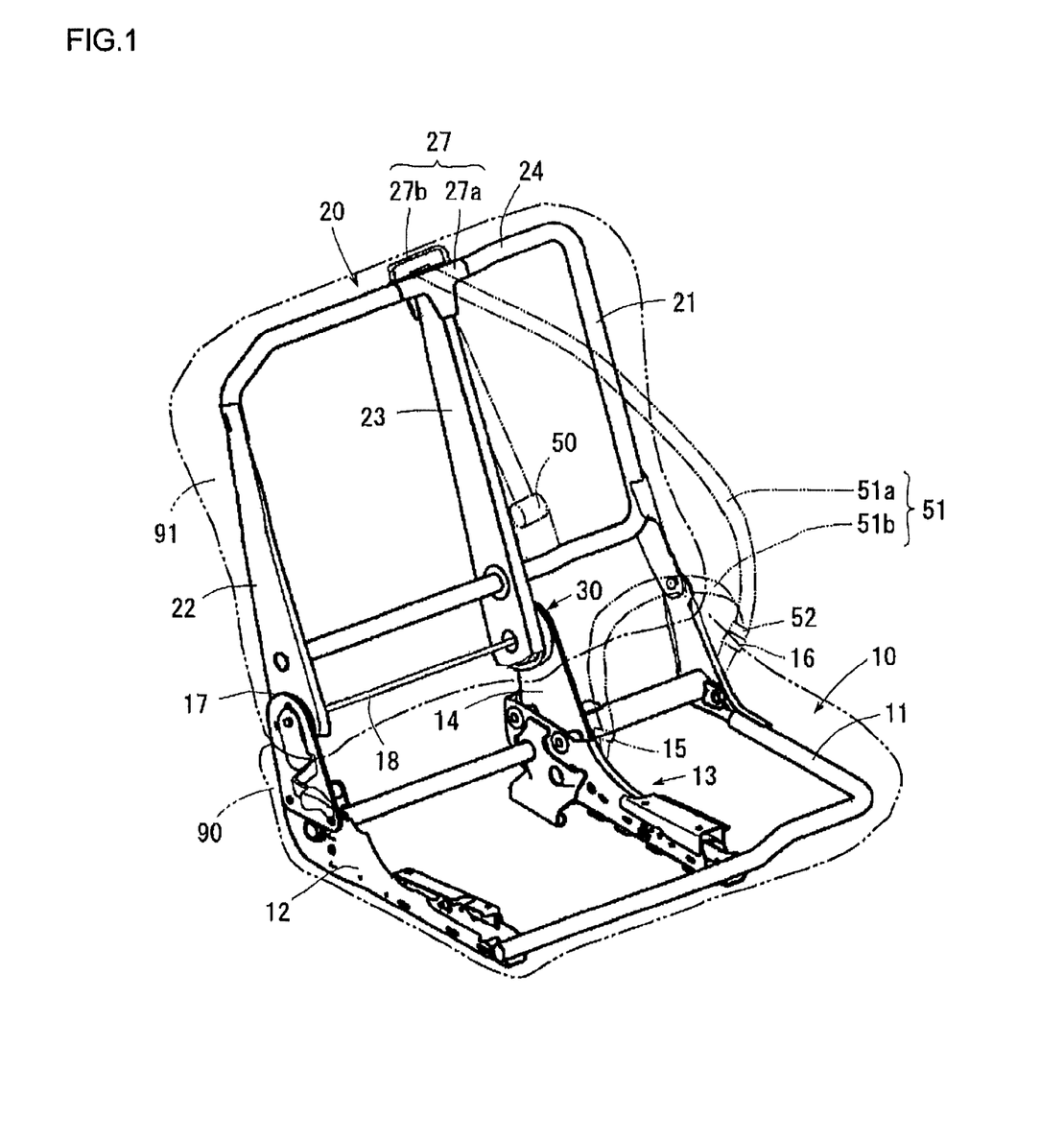
FIG. 1 is a perspective view of a vehicle seat frame according to the embodiment.

The vehicle seat frame according to the embodiment of the invention will be explained hereinafter with reference to the attached drawings. The vehicle seat frame of the embodiment, as shown in FIG. 1, includes a seat cushion frame 10 supporting a seat cushion 90, a seat back frame 20 supporting a seat back 91, a recliner 30 rotatably connecting the seat back 91 relative to the seat cushion and adjusting the relative rotation angle thereof and a shoulder belt anchor 27 provided at an upper portion of the seat back frame 20. The shoulder belt anchor 27 includes a joint portion 27a and a belt guide portion 27b.

Back side frames 21 and 22 are provided at both sides of the seat back frame 20, respectively and a hollow quadrangular prism shaped back center frame 23 is provided at the central portion of the seat back frame 20. Upper end portions of the back side frames 21 and 22 are connected together by an upper pipe 24 and the central portion of the upper pipe 24 is connected to the upper end portion of the back center frame 23 through the joint portion 27a. This joint portion 27a also functions to protect a later explained shoulder belt portion 51a. The belt guide portion 27b is provided at the upper portion of the joint portion 27a for guiding the winding and rewinding of the shoulder belt portion 51a. Cushion side frames 11 and 12 are provided at both ends of the seat cushion frame 10 and a cushion center frame 13 is provided at the central portion of the seat cushion frame 10. A thick plate (plank) bracket 14 is fastened to the upper portion of the cushion center frame 13 by bolts. The recliner 30 is provided between the back center frame 23 and the bracket 14 for rotatably connecting the back center frame 23 and the bracket 14. This recliner 30 is connected to another recliner 17 provided on the back side frame 22 through a connecting shaft 18.

Further, a retractor 50 is attached to the seat back frame 20 and one end of a seat belt 51, formed by the shoulder belt portion 51a and the lap belt portion 51b, is retracted into the retractor 50. The other end of the seat belt 51 is fixed to an anchor plate 15 attached to the cushion center frame 13 and the middle portion of the seat belt 51 is inserted into a tongue plate 52. This tongue plate 52 is detachably attached to a buckle 16 attached to the cushion side frame 11. The portion from the retractor 50 to the tongue plate 52 is defined as the shoulder belt portion 51a of the seat belt 51 and the remaining portion from the tongue plate 52 to the anchor plate 15 is defined as the lap belt portion 51b of the seat belt 51.

Figure 2:
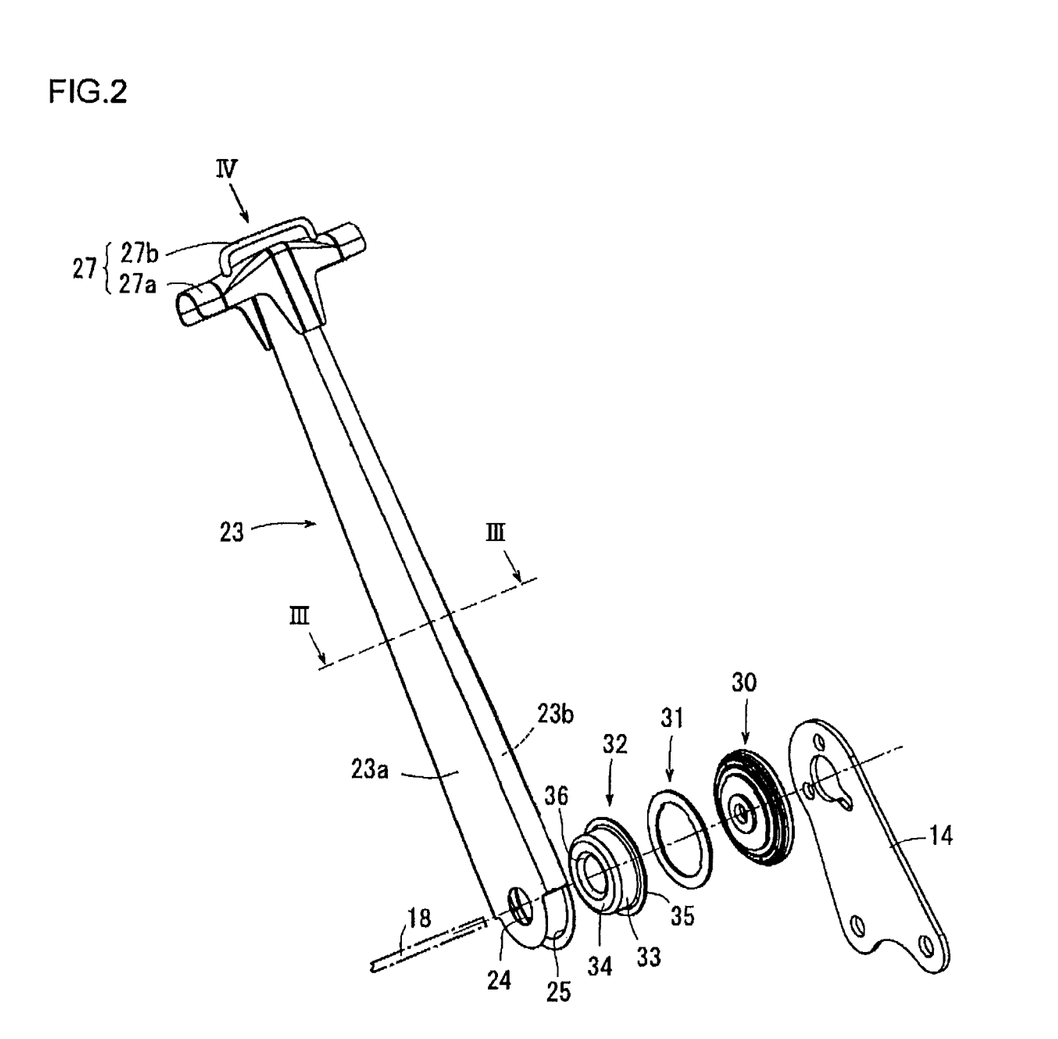
FIG. 2 is an exploded perspective view of a back center frame of the vehicle seat frame according to the embodiment.

FIG. 2 is an exploded perspective view of the back center frame 23. The back center frame 23 is formed by bending a thin steel plate and connecting the bent steel plate by welding and the like to form a quadrangular prism shape. Widths of the opposing two side plate portions 23a and 23b are widened towards connecting portion with the bracket 14 (downward as viewed in FIG. 2). A shoulder belt anchor 27 is provided at the upper end of the back center frame 23 for connecting the back center frame 23 and an upper pipe 24. The shoulder belt anchor 27 extends in a vehicle width direction and includes the joint portion 27a for supporting a vehicle front/rear direction side outer surface (later explained front plate portion 23c and rear plate portion 23d) of the back center frame 23 and a belt guide portion 27b extending in a vehicle width direction apart from the joint portion 27a with a predetermined distance and connected to the joint portion 27a at the bent both ends. A shoulder belt is inserted between the joint portion 27a and the belt guide portion 27b. A shaft bore 24 is provided at the under portion of the side plate portion 23a of the back center frame 23 for inserting the connecting shaft 18 therethrough and an attaching bore 25 is provided at the under portion of the side plate portion 23b and arranged coaxially with the shaft bore 24 for attaching the connecting member 32 by placing the connecting member 32 in the back center frame 23.

The connecting member 32 is formed by an outer cylinder portion 33, a ceiling portion 34, a flange portion 35 and an inner cylinder portion 36. The outer cylinder portion 33 is of cylindrical shape and the annular shape ceiling portion 34 extends inwardly from one axial end of the outer cylinder portion 33. The inner cylinder portion 36 is of cylindrical shape and disposed in the inner periphery of the ceiling portion and formed integrally therewith. The inner cylinder portion 36 is coaxially accommodated in the outer cylinder portion 33. The flange portion 35 extends outwardly from the other axial end of the outer cylinder portion 33. An annular attaching piece 31 and the recliner 30 are provided between the connecting member 32 and the bracket 14 for easy attachment of the connecting member 32 and the recliner 30.

The connecting member 32 is inserted into the back center frame 23 through the attaching bore 25 and the ceiling portion 34 is welded to the side plate portion 23a of the back center frame 23 along the entire periphery thereof. Further, the flange portion 35 of the connecting member 32 is welded to the side plate portion 23b of the back center frame 23 along the entire periphery at the outer cylinder portion 33 side surface and the other side surface of the flange portion 35 opposite to the outer cylinder portion side surface is welded to the attaching piece 31 along the entire periphery thereof. Further, the other end of the inner cylinder portion 36 of the connecting member 32 is welded to the recliner 30 along the entire periphery. The recliner 30 is attached at respective sides to the connecting member 32, the attaching piece 31 and the bracket 14. According to this structure, the back center frame 23 and the bracket 14 are rotatably connected through the recliner 30. It is noted here that a known structure is used for the recliner 30 and the explanation thereof is omitted.

Figure 3:
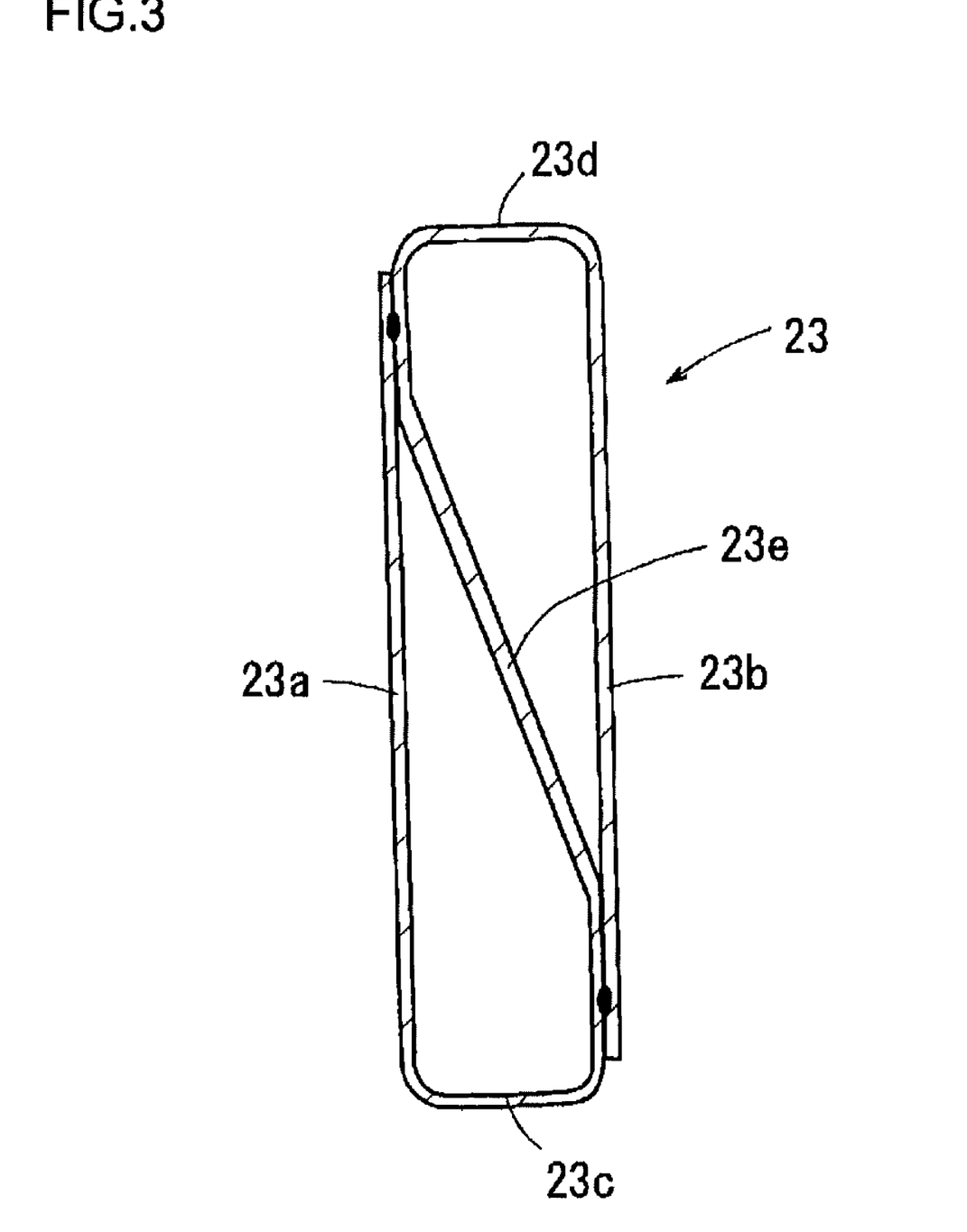
FIG. 3 is a cross sectional view of a back center frame of the vehicle seat frame according to the embodiment taken along the line III-III of FIG. 2.

FIG. 3 is a cross sectional view of the back center frame 23. As shown in FIG. 3, the back center frame 23 includes side plate portions 23a and 23b, front plate portion 23c, a rear plate portion 23d and a reinforcement plate 23e. The reinforcement plate 23e extends in a longitudinal direction like the side plate portions 23a and 23b and connects the side plate portion 23a and the side plate portion 23b with an inclination having a predetermined angle. The side plate portions 23a and 23b, front plate portion 23c and rear plate portion 23d and the reinforcement plate 23e are all made from one single steel plate by bending and connecting the bent ends by welding. It is noted that the "outer peripheral portion" is structured by the side plate portions 23a and 23b, the front plate portion 23c, the rear plate portion 23d and the reinforcement plate 23d.

Figure 4:
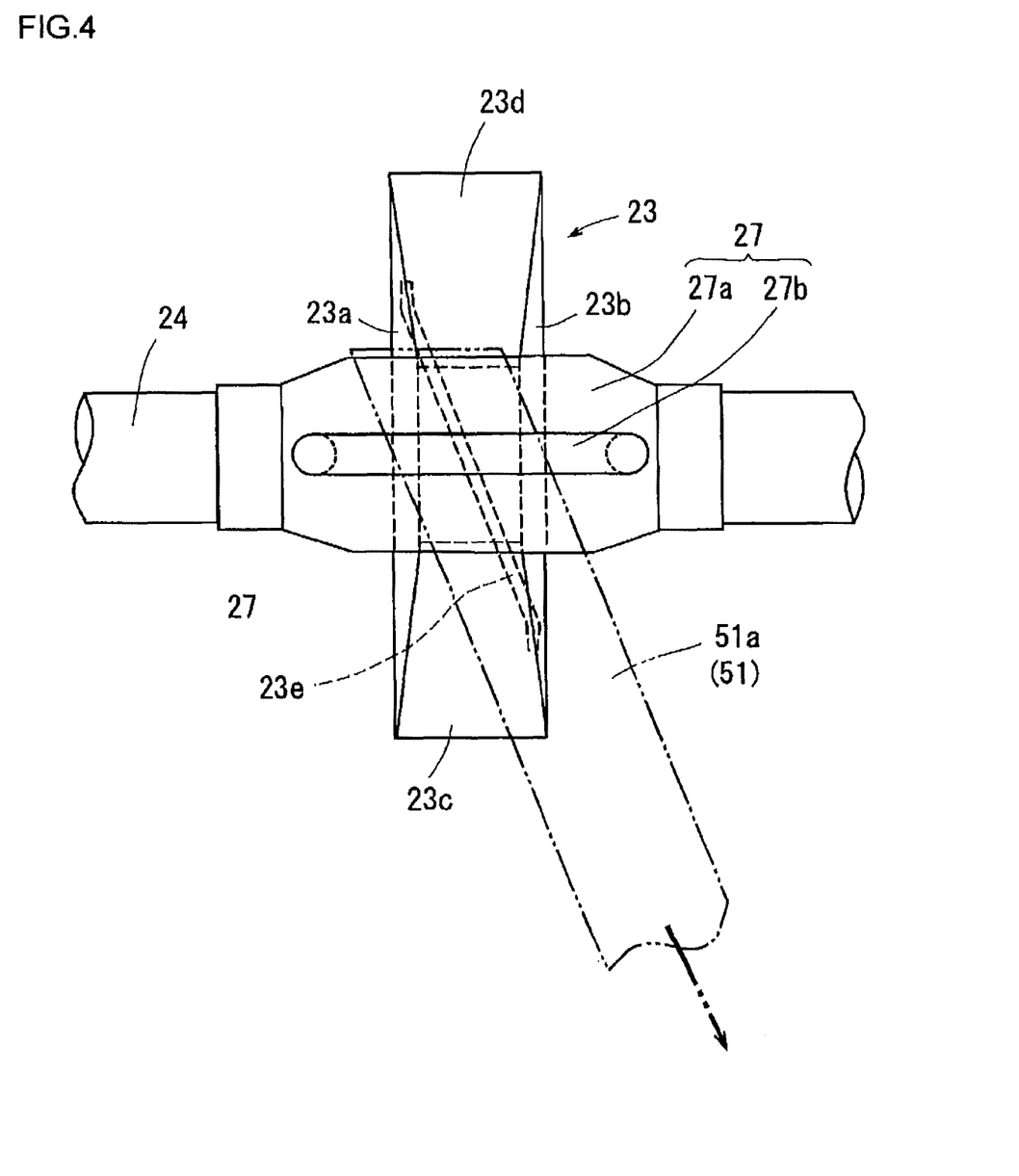
FIG. 4 is a plane view of a back center frame of the vehicle seat frame according to the embodiment as viewed from the arrow IV of FIG. 2.

FIG. 4 shows the back center frame 23 seen from an upper direction. As shown in FIG. 4, when the seat belt 51 is locked, a large load is applied on the shoulder belt 51a in an arrowed direction. The large load is transmitted from the shoulder belt 51a through the joint portion 27a of the shoulder belt anchor 27 to the back center frame 23. The reinforcement plate 23e which connects the side plate portions 23a and 23b is arranged to be in parallel with the load applying direction on the shoulder belt 51a. In other words, the reinforcement plate 23e is provided in parallel with the direction in which the shoulder belt 51a, inserted between the joint portion 27a and the belt guide portion 27b is pulled out towards the buckle 16.

According to the vehicle seat frame of this embodiment, the back center frame 23 includes the hollow quadrangular prism shaped outer peripheral portion 23a, 23b, 23c and 23d and the reinforcement plate 23e accommodated in the outer peripheral portion 23a, 23b, 23c and 23d. And, the reinforcement plate 23e is provided in parallel with the direction of load applied on the shoulder belt anchor 27 from the shoulder belt 51a. Here, when the seat belt 51 is locked due to a sudden vehicle deceleration, a large load is applied on the back center frame 23 of the seat back frame 20 through the shoulder belt anchor 27. However, since the reinforcement plate 23e is provided in parallel with the direction of the load applied on the shoulder belt anchor 27 from the shoulder belt 51a, deformation of the back center frame 23 can be prevented sufficiently even the reinforcement plate is made of a thin walled plate. Accordingly, the vehicle seat frame according to the embodiment is lightweight and strong.

According to the vehicle seat frame, since the outer peripheral portion 23a, 23b, 23c and 23d and the reinforcement plate 23e are formed by a single steel plate bent and connected at the bent ends by welding, the number of component is reduced. It is noted here that the outer peripheral portion 23a, 23b, 23c and 23d and the reinforcement plate 23e may be formed from two different materials and may be connected by welding.

Further, according to the vehicle seat frame of this embodiment, the shoulder belt anchor 27 is provided at an upper end of the outer peripheral portion 23a, 23b, 23c and 23d and the reinforcement plate 23e that extend in a vehicle upward direction and therefore, the load applied on the shoulder belt anchor 27 from the shoulder belt 51a is mostly received at the outer peripheral portion 23a, 23b, 23c and 23d and the reinforcement plate 23e. Thus the deformation of the seat back frame 20 can be prevented.

In the vehicle seat frame according to the embodiment, the shoulder belt anchor 27 includes a joint portion 27a and a belt guide portion 27b and the joint portion 27a extends in a vehicle width direction and supports an outer side surface (front plate portion 23c and rear plate portion 23d) of the outer peripheral portion 23a, 23b, 23c and 23d in a vehicle longitudinal direction. According to this structure, a load applied to the shoulder belt anchor 27 from a shoulder belt 51a is mostly received at the outer peripheral portion 23a, 23b, 23c and 23d and the reinforcement plate 23e. Further, the belt guide portion 27b extends in the vehicle width direction apart from the joint portion 27a with a predetermined distance and is connected to the joint portion 27a at bent ends. Therefore, the shoulder belt 51a can be inserted between the joint portion 27a and the belt guide portion 27b with a simple structure. Further, the reinforcement plate 23e is arranged in parallel with a direction in which the shoulder belt 51a inserted between the joint portion 27a and the belt guide portion 27b is extracted towards a buckle 16 provided at a cushion side frame 11. Accordingly, the deformation of the seat back frame 20 can be sufficiently prevented even a thin reinforcement plate is used.

The invention has been explained on the vehicle seat frame according to the embodiments, however, the invention is not limited to these embodiments and variations and changes may be made without departing from the subject matter of the present invention.

INDUSTRIAL APPLICABILITY

The vehicle seat frame according to this invention is applicable to a vehicle seat frame having a shoulder belt anchor provided at an upper portion of the seat back frame.

The invention claimed is:

1. A vehicle seat frame comprising a seat cushion frame adapted to support a seat cushion, a seat back frame adapted to support a seat back, a recliner rotatably connecting the seat back relative to the seat cushion and adjusting the rotation angle thereof and a shoulder belt anchor provided on the seat back frame for supporting one end of a shoulder belt, wherein at least one of the seat cushion frame and the seat back frame includes a hollow quadrangular prism shaped outer peripheral portion and a reinforcement plate provided in the outer peripheral portion so as to be in parallel with a direction of load to be applied on the shoulder belt anchor from the shoulder belt under an occupant of the vehicle being restrained thereby, and wherein the outer peripheral portion and the reinforcement plate are formed from a single steel plate by bending and connecting respective bent ends of the bent steel plate.

2. The vehicle seat frame according to claim 1, wherein the outer peripheral portion and the reinforcement plate extend in a vehicle upward direction and the shoulder belt anchor is provided at an upper end of the outer peripheral portion and the reinforcement plate.

3. The vehicle seat frame according to claim 2, wherein the shoulder belt anchor includes a joint portion extending in a vehicle width direction and supporting an outer side surface of the outer peripheral portion in a vehicle longitudinal direction, and a belt guide portion extending in a vehicle width direction apart from the joint portion with a predetermined distance and connected to the joint portion at bent ends and that the reinforcement plate is arranged in parallel with a direction in which the shoulder belt inserted between the joint portion and the belt guide portion is pulled out towards a buckle provided at a side portion of the seat cushion frame.

4. The vehicle seat frame according to claim 1, wherein the outer peripheral portion and reinforcement plate constitute, in cross-section, a unicursal diagram.

5. The vehicle seat frame according to claim 4, wherein the outer peripheral portion is in the form of a low profile hollow rectangular structure and the reinforcement plate runs straight within the low profile hollow rectangular structure.

6. The vehicle seat frame according to claim 1, wherein the single steel plate comprises, in order, one half of the outer peripheral portion, the reinforcement plate, and the other half of the outer peripheral portion.

7. The vehicle seat frame according to claim 6, wherein the reinforcement plate runs straight and one half of the outer peripheral portion and the other half of the outer peripheral portion are in point symmetry with respect to a midpoint of the reinforcement plate.

8. The vehicle seat frame according to claim 1, wherein the reinforcement plate comprises a single reinforcement plate.

* * * * *